United States Patent
Rothleitner et al.

(10) Patent No.: US 6,677,734 B2
(45) Date of Patent: Jan. 13, 2004

(54) NON-INVERTING DUAL VOLTAGE REGULATION SET POINT POWER SUPPLY USING A SINGLE INDUCTOR FOR RESTRAINT CONTROL MODULE

(75) Inventors: Hubert Rothleitner, Villach (AT); Michael Breunig, Villach (AT); Colm Peter Boran, Novi, MI (US); David James Tippy, Farmington Hills, MI (US); Myron Ihor Senyk, Rochester Hills, MI (US); Paul Mario Camilleri, Brownstown, MI (US); Vincent Colarossi, Dearborn Heights, MI (US)

(73) Assignee: Autoliv ASP, Inc., Ogden, UT (US)

( * ) Notice: Subject to any disclaimer, the term of this patent is extended or adjusted under 35 U.S.C. 154(b) by 104 days.

(21) Appl. No.: 09/821,144

(22) Filed: Mar. 29, 2001

(65) Prior Publication Data

US 2002/0140410 A1 Oct. 3, 2002

(51) Int. Cl.⁷ .................................................. G05F 1/24
(52) U.S. Cl. ........................ 323/259; 323/222; 323/284; 323/224
(58) Field of Search ................................ 323/222, 259, 323/224, 225, 282, 284, 351, 299; 363/101

(56) References Cited

U.S. PATENT DOCUMENTS

| | | | |
|---|---|---|---|
| 4,245,286 A | | 1/1981 | Paulkovich et al. |
| 4,578,630 A | * | 3/1986 | Grosch ........................ 323/271 |
| 5,663,874 A | | 9/1997 | Mader et al. |
| 5,818,207 A | | 10/1998 | Hwang |
| 5,914,591 A | * | 6/1999 | Yasuda et al. ............... 323/224 |
| 5,949,222 A | | 9/1999 | Buono |
| 5,949,224 A | * | 9/1999 | Barkaro ....................... 323/282 |
| 5,973,944 A | * | 10/1999 | Nork ............................ 363/60 |
| 5,982,604 A | * | 11/1999 | Kojima et al. .............. 361/159 |
| 6,166,527 A | * | 12/2000 | Dwelley et al. ............. 323/222 |

* cited by examiner

Primary Examiner—Michael Sherry
Assistant Examiner—Gary L. Laxton
(74) Attorney, Agent, or Firm—James D. Erickson; Sally J. Brown

(57) ABSTRACT

A non-inverting dual voltage regulation set point power supply for a restraint control module is disclosed that includes a main power source. A regulated voltage generation circuit connected with said main power source for generating a regulated output voltage having an upper set point and a lower set point. A buck switch connected to said main power source and said regulated voltage generation circuit for bucking the regulated output voltage generated by said regulated voltage generation circuit to said upper set point if said voltage supplied from said main power source is greater than said upper set point. A boost switch connected with said regulated voltage generation circuit for boosting the regulated output voltage generated by said regulated voltage generation circuit to said lower set point if said voltage supplied from said main power source is less than said lower set point.

28 Claims, 3 Drawing Sheets

NON-INVERTING DUAL VOLTAGE REGULATION SET POINT POWER SUPPLY USING A SINGLE INDUCTOR FOR RESTRAINT CONTROL MODULE

FIELD OF THE INVENTION

The present invention relates generally to air bag systems for use as safety devices in automotive vehicles and, more particularly, to a non-inverting dual voltage regulation set point power supply using a single inductor for a restraint control module.

BACKGROUND OF THE INVENTION

Over the past several years, there has been a trend in the automotive industry to install air bag systems in vehicles to enhance protection traditionally afforded vehicle occupants through the use of seat belts. In some automotive vehicles, the inflatable restraint system may be an air bag system disposed within an occupant compartment in the automotive vehicle in close proximity to either a driver occupant or one or more passenger occupants. Usually, the air bag system includes a restraint control module that is connected to the vehicle structure and an air bag for deployment through an opening in a cover to extend and inflate in an occupant compartment of the automotive vehicle. The deployed air bag restrains movement of the occupant to protect the occupant from forcefully hitting parts of the automotive vehicle as a result of an automobile accident.

Air bag systems typically include a restraint control module, a reaction canister and an air bag and inflator that are stored inside the reaction canister. Generally speaking, the inflator is actuated by a signal received from a vehicle deceleration sensor or accelerometer that is connected to the restraint control module, which, in turn, causes a discharge of inflator gas into the interior of the air bag. The restraint control module controls the overall operation of the air bag system and essentially could be viewed as the main control unit for the air bag system.

As with any system based on electronic components and sensors, air bag systems and their associated electronic components, require power from a power supply in order to function properly. During normal operation, the power used to drive an air bag system and its related components originates from a battery that is located in the automotive vehicle. However, the voltage provided by the battery can often vary dramatically during operation depending on various load conditions as well as the operating conditions of the automobile. As such, a need exists to provide certain components and sensors of an air bag system with a regulated voltage supply that is capable of providing power to various components of the air bag system.

SUMMARY OF THE PRESENT INVENTION

The present invention discloses a non-inverting dual voltage regulation set point power supply that is preferentially used in a restraint control module of an automobile air bag system. The non-inverting dual voltage regulation set point power supply includes a main power source, which originates from an automobile battery in the preferred embodiment. A regulated voltage generation circuit is connected with the main power source, which generates a regulated output voltage with a predetermined upper set point and a lower set point. A buck switch is connected to the main power source and the regulated voltage generation circuit. The buck switch causes the regulated output voltage generated by said regulated voltage generation circuit to be set at the upper set point if the voltage supplied from the main power source is greater than the upper set point or track the input power from the main power source for voltages exceeding the lower set point and below the upper set point. A boost switch is connected with the regulated voltage generation circuit for boosting the regulated output voltage generated by the regulated voltage generation circuit to the lower set point if the voltage supplied from the main power source is less than the lower set point.

In the preferred embodiment of the present invention, the non-inverting dual voltage regulation set point power supply further includes a buck gate driver that is connected to gate of the the buck switch. The buck gate driver controls the switching operation of the buck switch such that the buck switch regulates the regulated output voltage at the upper set point during periods in which the input voltage from the main power source is greater than the upper set point. The preferred buck switch is a DMOS transistor, which is preferentially a field-effect transistor (FET).

The non-inverting dual voltage regulation set point power supply also includes a boost gate driver connected to the gate of the boost switch. The boost gate driver controls the switching operation of the boost switch such that the boost switch regulates the regulated output voltage at the lower set point if the voltage from the main power source is below the lower set point. The preferred boost switch is also a DMOS transistor, which is also preferentially a FET.

A regulation control circuit is connected to the buck gate driver and the boost gate driver. The regulation control circuit is used to selectively drive the buck gate driver and the boost gate driver to maintain the regulated output voltage between the upper set point and the lower set point. In the preferred embodiment, the regulation control circuit comprises a pair of error amplifiers connected to a pair of pulse width modulation comparators. A voltage feedback circuit is connected to the regulated output voltage and the regulation control circuit. The preferred voltage feedback circuit includes a voltage divider circuit that has a plurality of resistors.

The regulated voltage generation circuit comprises an inductor connected with a capacitor. The use of a single inductor minimizes parts by sharing the inductor for both buck and boost operations. It also provides lower inductor ripple (lower EMI) and allows for the use of a smaller sized inductor, thereby providing further cost benefits over prior systems.

DETAILED DESCRIPTION OF THE PREFERRED EMBODIMENTS OF THE INVENTION

Figure 1:
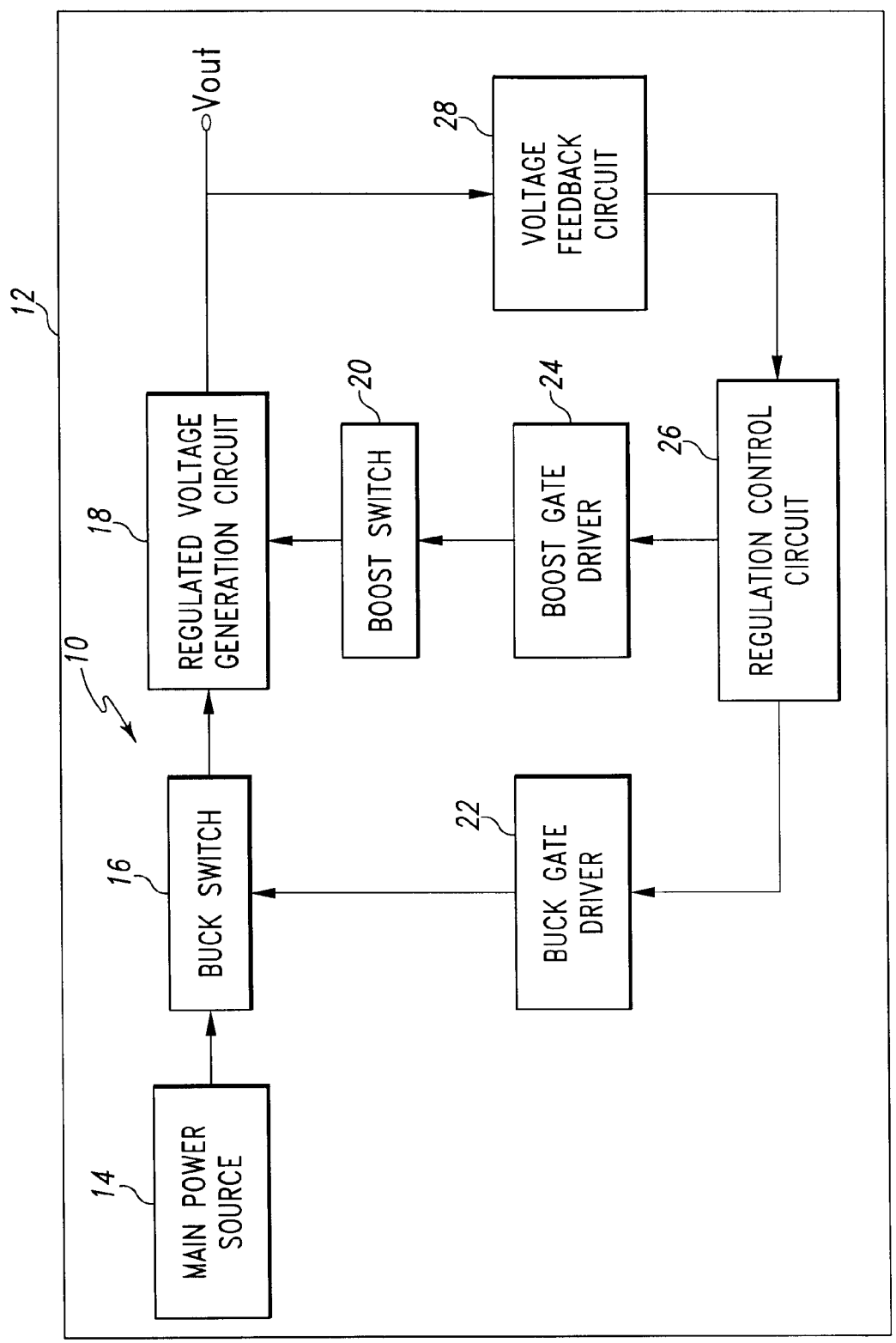
FIG. 1 illustrates a block diagram of a preferred non-inverting dual voltage regulation set point power supply for a restraint control module.

Referring to FIG. 1, a block diagram of a preferred non-inverting dual voltage regulation set point power supply 10 is illustrated. In the preferred embodiment of the present invention, the non-inverting dual voltage regulation set point power supply 10 is used as a component of a restraint control module 12 to provide power to, by way of example only, remote sensors and the microprocessor of the restraint control module. During normal operation, the non-inverting dual voltage regulation set point power supply 10 provides a regulated output voltage (Vout) that varies between an upper set point and a lower set point depending on the voltage level provided from a main power source 14. The non-inverting dual voltage regulation set point power supply 10 is capable of providing the regulated output voltage (Vout) despite wide variations in the input voltage received from the main power source 14.

Although not illustrated, in the preferred embodiment of the present invention, the main power source 14 originates from a car battery. As known in the automobile industry, sometimes the output voltage of batteries can vary depending on the loads being experienced by the vehicle and various other operating conditions. The non-inverting dual voltage regulation set point power supply 10 is used to generate and maintain a regulated output voltage (Vout) that only varies between the upper set point and the lower set point during operation, despite the variations experienced in the amount of supply voltage provided from the battery. Although the preferred embodiment of the present invention is disclosed in a restraint control module 12, those skilled in the art would appreciate and recognize that the present invention could also be used in other systems as well.

The non-inverting dual voltage regulation set point power supply 10 includes a buck switch 16 that is connected to the main power source 14 and a regulated voltage generation circuit 18. A boost switch 20 is also connected with the regulated voltage generation circuit 18. During operation, if the voltage provided from the main power source is above the upper set point, the buck switch 16 is used to regulate the regulated voltage generation circuit 18 to provide a regulated output voltage (Vout) equal to the value of the upper set point. If the voltage provided from the main power source 14 is lower than the lower set point, the boost switch 20 is used to regulate the regulated voltage generation circuit 18 to provide a regulated output voltage (Vout) equal to the value of the lower set point. During operation, if the voltage provided from the main power source 14 is below the upper set point and above the lower set point, the regulated output voltage (Vout) generated by the regulated voltage generation circuit 18 follows or tracks the voltage level of the main power source 14.

As further illustrated in FIG. 1, a buck gate driver 22 is connected to the buck switch 16 and a boost gate driver 24 is connected to the boost switch 20. The buck gate driver 22 controls operation of the buck switch 16 and the boost gate driver 24 controls operation of the boost switch 20. During operation, the buck gate driver 22 drives the buck switch 16 to regulate the regulated output voltage (Vout) generated by the regulated voltage generation circuit 18 to the upper set point when the input voltage from the main power source 14 is above the upper set point or tracks the input voltage from the main power source 14 if the voltage is below the upper set point and above the lower set point. If the input voltage from the main power source 14 falls below the lower set point, the boost gate driver 24 drives the boost switch 20 to boost or raise the regulated output voltage (Vout) generated by the regulated voltage generation circuit 18 to the lower set point.

A regulation control circuit 26 is connected to the buck gate driver 22 and the boost gate driver 24. The regulation control circuit 26 is used to drive the buck gate driver 22 and the boost gate driver 24. A voltage feedback circuit 28 is connected to the regulated output voltage (Vout) of the regulated voltage generation circuit 18 and the regulation control circuit 26 for providing a feedback signal to the regulation control circuit 26. During operation, the voltage feedback circuit 28 senses the magnitude of the regulated output voltage (Vout) and sends signals corresponding to this value to the regulation control circuit 26. The regulation control circuit 26 then uses this signal to cause the buck gate driver 22 to buck or track the regulated output voltage (Vout) with the buck switch 16, or the boost gate driver to boost the regulated output voltage (Vout) depending on whether the regulated output voltage (Vout) needs to be decreased, increased or track the input voltage from the main power source 14.

Figure 2:
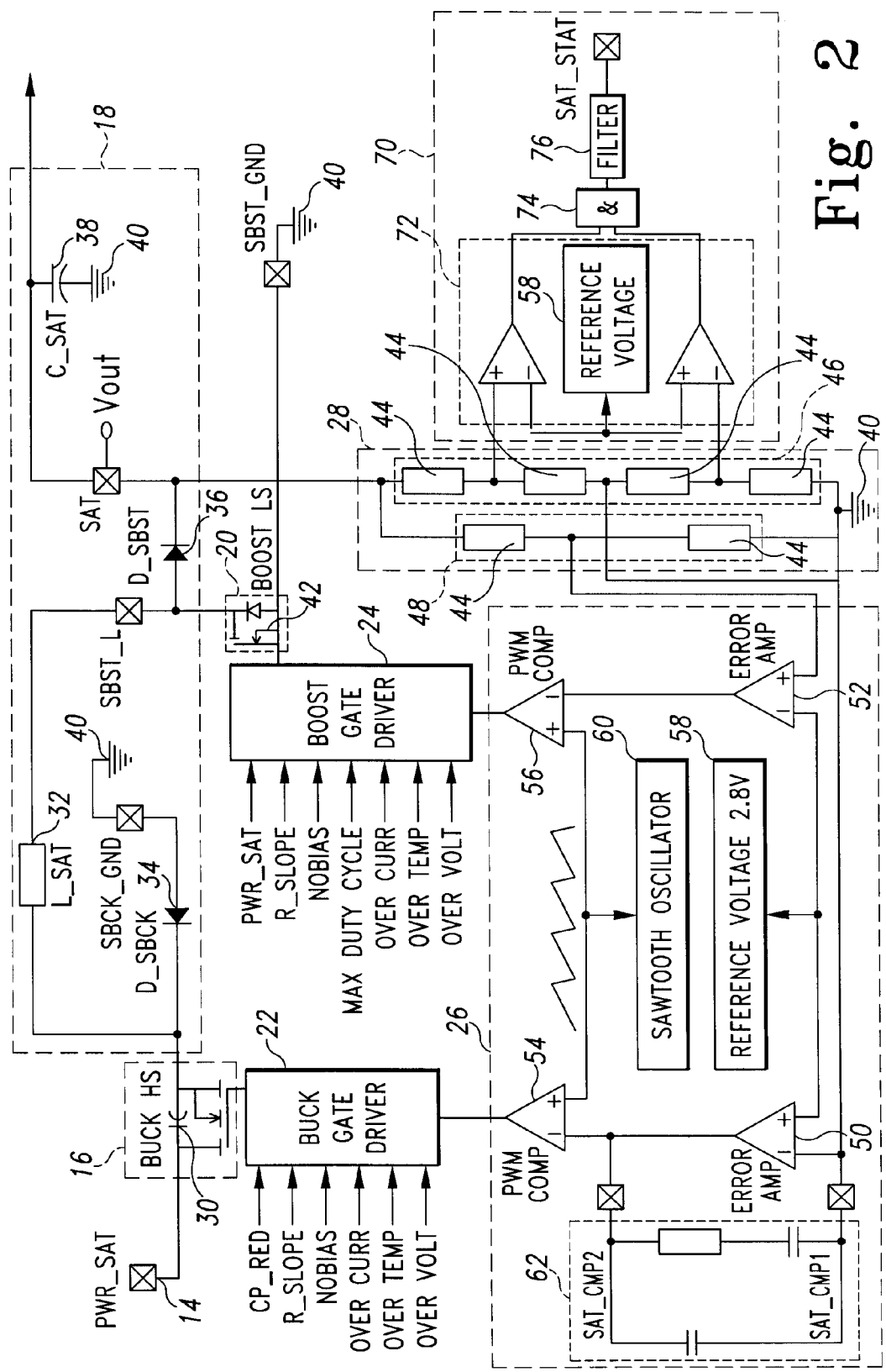
FIG. 2 represents a detailed circuit schematic of the preferred non-inverting dual voltage regulation set point power supply illustrated in FIG. 1.

Referring to FIG. 2, a more detailed circuit schematic of the preferred non-inverting dual voltage regulation set point power supply 10 is illustrated. As depicted, the input voltage from the main power source 14 is connected to the buck switch 16. The preferred buck switch 16 is a first DMOS transistor 30 and the input voltage from the main power source 14 is connected to the drain of the first DMOS transistor 30. The source of the first DMOS transistor 30 is connected to the regulated voltage generation circuit 18 and the gate of the first DMOS transistor 30 is connected to the buck gate driver 22.

In the preferred embodiment, the first DMOS transistor 30 is a field-effect transistor (FET) that is designed to switch a maximum of 40 V with a drain current limitation of approximately 1 A. To make the power dissipation of the FET smaller, the voltage drop across the FET can be reduced by increasing the gate voltage from the buck gate driver 22. Although not illustrated, this improvement may be implemented by using a charge-pump to drive the gate of the FET, the charge-pump being used to increase the voltage used to drive the gate of the buck switch 16.

As further illustrated in FIG. 2, the preferred regulated voltage generation circuit 18 includes an inductor 32, a first diode 34, a second diode 36 and a capacitor 38. The inductor 32 is connected to the source of the first DMOS transistor 30 and the cathode of the first diode 34. The anode of the first diode 34 is connected to a ground connection 40 and the cathode of the first diode 34 is also connected to the source of the first DMOS transistor 30. The first diode 34 is used to ensure that the inductor 32 does not lose energy while the buck switch 16 is switching during operation. The use of a single inductor 32 is important in the present invention because it minimizes parts by sharing the inductor 32 for both buck and boost operations, provides lower inductor 32 ripple (lower EMI) and allows for the use of a smaller sized inductor 32.

As illustrated, the inductor 32 is also connected to the boost switch 20 and the anode of the second diode 36. The cathode of the second diode 36 is connected to the capacitor 38 and the voltage feedback circuit 28. The capacitor 38 is also connected to the ground connection 40. The second diode 36 ensures that the capacitor 38 does not discharge its output voltage while the boost switch 20 is switching. During operation, the regulated voltage generation circuit 18 is controlled by the buck switch 16 and the boost switch 20 to generate a regulated output voltage (Vout) that varies between the upper set point and the lower set point depending on the input voltage from the main power source 14.

In the preferred embodiment of the present invention, the preferred non-inverting dual voltage regulation set point power supply 10 is configured to provide an output current for general supply purposes in the restraint control module 12. In addition, the upper set point is set at 11.0 V and the lower set point is set at 10.5 V. Those skilled in the art would recognize that the above-referenced set points and current output level may be adjusted and that these values are being used for illustrative purposes only and should not be construed as a limitation of the present invention.

As depicted in FIG. 2, the boost switch 20 is a second DMOS transistor 42, which is also preferentially a FET in the preferred embodiment. The drain of the second DMOS transistor 42 is connected to the inductor 32 and the anode of the second diode 36 of the regulated voltage generation circuit 18. The source of the second DMOS transistor 42 is connected to the ground connection 40 and the gate of the second DMOS transistor 42 is connected to the output of the boost gate driver 24. As previously set forth, the second DMOS transistor 42 may have all of the operating characteristics of the first DMOS transistor 30.

As previously set forth, during operation, the boost switch 20 boosts the regulated output voltage (Vout) generated by the regulated voltage generation circuit 18 to the lower set point if the input voltage from the main power source 14 falls below the lower set point. This is accomplished by switching the second DMOS transistor 42 using the boost gate driver 24 at a predetermined interval or duty cycle, which is based on the amount of voltage present from the main power source 14 and the corresponding signals generated by the voltage feedback circuit 28.

During boost operations, the buck switch 16 is held on and the boost switch 20 is switched on and off at predetermined intervals, thereby shorting out the inductor 32 to the ground connection 40 when the boost switch 20 activated. This causes the inductor 32 to store energy quickly and when the boost gate 20 is turned off, the energy from the inductor 32 is delivered to the capacitor 38 through the second diode 36. The second diode 36 ensures that the capacitor 38 does not discharge the delivered energy or voltage through the regulated voltage generation circuit 18 while the boost switch 20 is activated. As a result of this, the regulated voltage generation circuit 18 is capable of generating a higher regulated output voltage (Vout) than the input voltage that is provided from the main power source 14.

As illustrated in FIG. 2, the preferred voltage feedback circuit 28 is comprised of a plurality of resistors 44 that are connected in parallel to form a pair of voltage divider networks 46, 48. The first resistor network 46 is used to provide a feedback signal to the regulation control circuit 26 corresponding to the upper set point and the second resistor network 48 is used to provide a feedback signal corresponding to the lower set point. Based on the values of these signals, the regulation control circuit 26 is capable of adjusting operation of the buck gate driver 22 or the boost gate driver 24, depending on the magnitude of the input voltage from the main power source 14, as previously set forth.

The preferred regulation control circuit 26 includes a buck error amplifier 50, a boost error amplifier 52, a buck pulse width modulator comparator 54, a boost pulse width modulator comparator 56, a reference voltage connection 58 and a sawtooth oscillator 60. As illustrated, the output of the first divider network 46 of the voltage feedback circuit 28 is connected to an input of the buck error amplifier 50 and the reference voltage connection 58 is connected to the other input of the buck error amplifier 50. The output of the second divider network 48 of the voltage feedback circuit 28 is connected to an input of the boost error amplifier 52 and the other input of the boost amplifier 52 is connected to the reference voltage connection 58. During operation, the error amplifiers 50, 52 of the regulation control circuit 26 compare the voltage present on the reference voltage connection 58 with the signals that are generated by the first and second divider networks 46, 48 of the voltage feedback circuit 28.

The output of the buck error amplifier 50 is connected to an input of the buck pulse width modulation comparator 54 and the output of the boost error amplifier 52 is connected to an input of the boost pulse width modulation comparator 56. The second input of each respective pulse width modulation comparator 54, 56 is connected to the sawtooth oscillator 60. The output of buck pulse width modulation comparator 54 is connected to the buck gate driver 22 and the output of the boost pulse width modulation comparator 56 is connected to the boost gate driver 24. As such, during operation, the regulation control circuit 26 is used to control the buck gate driver 22 and the boost gate driver 24, which, in turn, control the operation of the buck switch 16 and the boost switch 20 to thereby generate the regulated output voltage (Vout).

Figure 3:
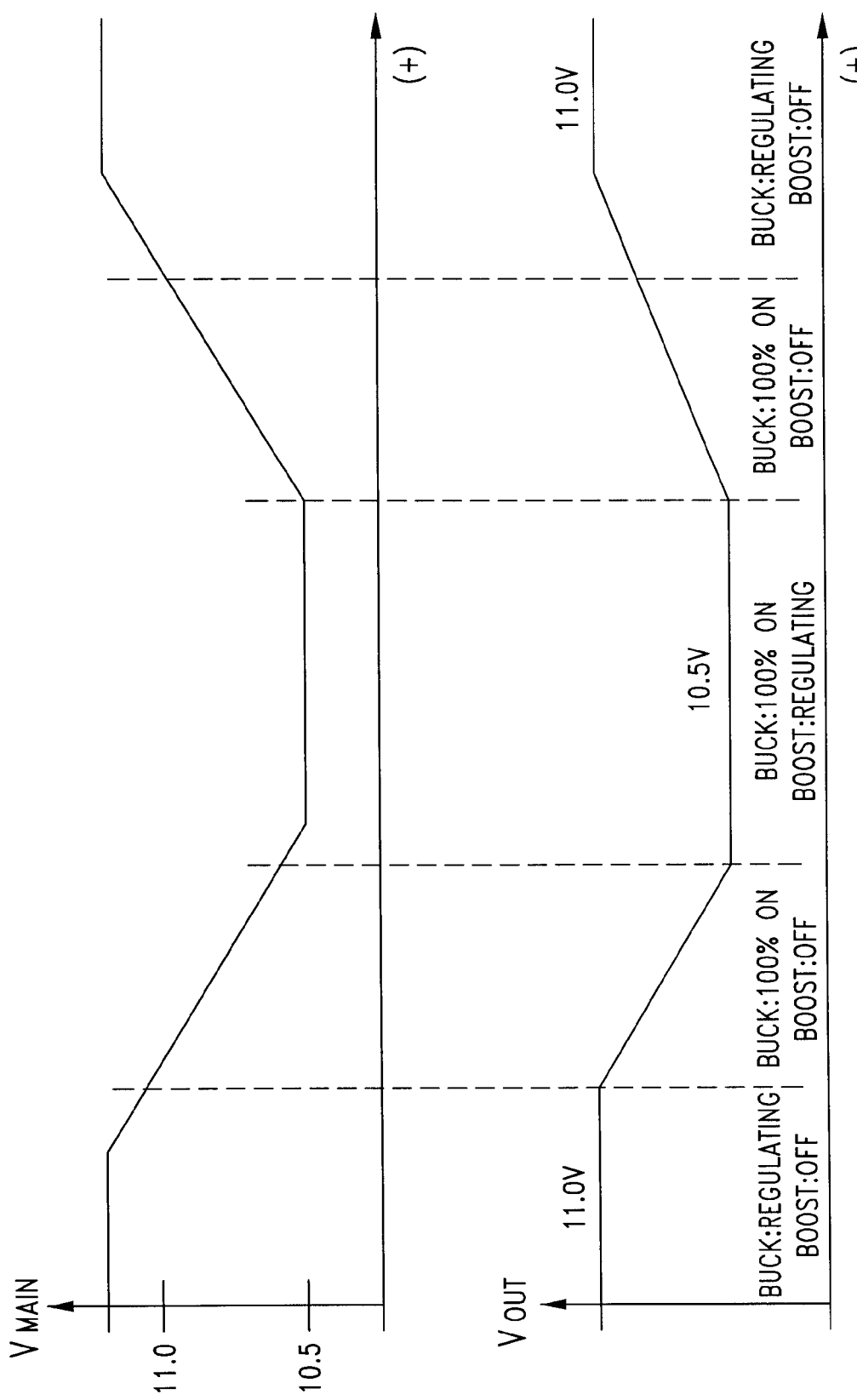
FIG. 3 illustrates a voltage versus time plot that shows how the voltage provided from the main power source is regulated to produce the regulated output voltage.

Referring to FIG. 3, an output voltage versus input voltage time plot is illustrated that compares the regulated output voltage (Vout) with the voltage supplied from the main power source 14, which is represented as (Vmain). For the purpose of illustration only, assume that the upper set point has been set at 11.0 V and the lower set point has been set at 10.5 V. As illustrated, if the input voltage from the main power source 14 is greater than the upper set point, the buck gate driver 22 is regulating the voltage generated by the regulated voltage generation circuit 18 to the upper set point, which is 11.0 V, by switching the buck switch 16 at a controlled interval or duty cycle. During this time, the buck gate driver 22 is regulating and the boost gate driver 24 is not because no boosting is required as the regulated output voltage (Vout) is above the lower set point. As such, the boost switch 20 remains off during time periods when the voltage from the main power source 14 is greater than the lower set point.

If the voltage from the main power source 14 begins to drop below the upper set point, the buck switch 16 remains completely turned on and the boost switch 20 remains off until the voltage from the main power source 14 reaches the lower set point. The regulated output voltage (Vout) tracks or follows the voltage on the main power source 14 between the upper and lower set points. Since the buck switch 16 remains on during these time periods, the voltage from the main power source 14 is passed directly to the regulated voltage generation circuit 18, which follows or tracks the voltage value until it either reaches the upper or lower set point.

As illustrated in FIG. 3, once the input voltage from the main power source 14 goes below the lower set point, the boost switch 20 begins regulating the regulated output voltage (Vout) generated by the regulated voltage generation circuit 18 at the lower set point. As the voltage on the main power source 14 begins to rise above the lower set point, the boost switch 20 stops regulating and the buck switch 16 remains on to ensure that the energy from the main power source 14 is transferred to the regulated voltage generation circuit 18. As the voltage from the main power source 14 raises above the upper set point, the buck gate driver 22 begins controlling the switching of the buck switch 16 to regulate the regulated output voltage (Vout) generated by the regulated voltage generation circuit 18, to the upper set point.

Referring back to FIG. 2, the buck gate driver 22 and the boost gate driver 24 receive a plurality of input signals from various circuits of the restraint control module 14 to ensure that the non-inverting dual voltage regulation set point power supply 10 functions properly. Those skilled in the art would recognize that several control input signals may be used in other implementations of the present invention. As illustrated in FIG. 2, the preferred inputs to the buck gate driver 22 and the boost gate driver 24 in the restraint control module 14 include a charge pump ready signal (CP_RED), a slope signal (R_SLOPE) and a no-bias signal (NOBIAS).

The charge pump ready signal (CP_RED) is generated from the charge pump (not illustrated) that is used in the preferred embodiment to drive the gate of the buck switch 16, whereby use of the charge pump minimizes power dissipation in the buck switch 16 as previously set forth. In the preferred embodiment, slope control is implemented in the buck gate driver 22 and the boost gate driver 24 to actively control both rise and fall times of the buck switch 16 and boost switch 20 waveforms and to minimize EMI emissions and interference with diode 34, 36 recovery times and/or external nodal capacitance. The rise and fall times of the buck switch 16 and the boost switch 20 waveforms can be adjusted by an external resistor (RSLOPE), which is not illustrated in FIG. 2. The rise and fall times are symmetrical and are set by the external resistor (RSLOPE), which provides the slope signal to the buck gate driver 22 and the boost gate driver 24. The no-bias signal (NOBIAS) is a signal that indicates if there is sufficient voltage in the overall system or automobile to drive the non-inverting dual voltage regulation set point power supply 10.

In the preferred embodiment of the present invention, the non-inverting dual voltage regulation set point power supply 10 is provided with several features that provide protection to the buck switch 16 and the boost switch 20. Referring to FIG. 2, the preferred regulation control circuit 26 includes an external loop compensation network 62 that is used to further stabilize the buck power supply control loop. As illustrated, the preferred external loop compensation network 62 comprises a resistor-capacitor (RC) circuit.

The preferred buck switch 16 and boost switch 20 operate at the tuned frequency of the sawtooth oscillator 60 and can include a maximum duty cycle limitation, over-voltage protection, under-voltage protection and over-current shutdown on a cycle-by-cycle basis. However, in the preferred embodiment, the buck gate driver 22 does not include a maximum duty-cycle limitation so that the buck switch 16 is capable of providing 100 percent duty cycle to maximize the dynamic range of input supply to regulate its output. Although not illustrated, a duty-cycle circuit can monitor the duty cycle of the boost switch 20 and provide a limitation signal (max. duty cycle) to the boost gate driver 24 in order to limit its duty cycle during operation. Those skilled in the art would recognize that several circuits exist that could monitor the duty cycle of the boost switch 20.

Over-current shutdown is provided by an over-current delay filter (not illustrated) that monitors the current flowing through the buck switch 16. Over-current shutdown is also provided on a cycle-by-cycle basis. Once the over-current threshold is exceeded and propagates through the over-current delay filter, the buck gate driver 22 and the boost gate driver 24 are shut down with an over-current signal (over current) from the over-current delay filter. The over-current delay filter prevents false immediate over-current shutdown due to high inrush currents from parasitic capacitors. Once the buck gate driver 22 and the boost gate driver 24 are shutdown due to over-current, they will remain off until the next oscillator cycle.

Over-voltage protection is also provided in the non-inverting dual voltage regulation set point power supply 10 on a cycle-by-cycle basis. When the regulated output voltage (Vout) substantially exceeds the regulated upper set point, the buck gate driver 22 and the boost gate driver 24 are turned off with an over-voltage signal (over voltage). Even though not illustrated, the over-voltage signal can be generated by a voltage sensing circuit that constantly monitors the regulated output voltage (Vout). Those skilled in the art recognize that several voltage-sensing circuits exist and may be used in the present invention.

In the preferred embodiment of the present invention, under-voltage protection is provided by sensing the voltage from the main power supply 14 and the voltage from the charge-pump (not illustrated) used to drive the gate of the buck switch 16. Although beyond the scope of the present invention, the actual voltage sensed from the main power supply 14 may also include the voltage that is capable of being provided from a backup power supply in the restraint control module 12. When the main power source 14 voltage level exceeds a predetermined threshold and the charge-pump voltage exceeds a second predetermined threshold, then the buck gate driver 22 and the boost gate driver 24 are allowed to operate normally. If these voltages fall below their predetermined thresholds, then the buck gate driver 22 and the boost gate driver 24 are shutdown with an under-voltage signal (not illustrated) that is directed to the buck gate driver 22 and the boost gate driver 24.

Over-temperature protection is provided by a temperature sensing circuit (not illustrated) that senses the temperature of both the boost switch 20 and buck switch 16. When the temperature of either switch 16, 20 exceeds a programmed threshold, the buck switch 16 and/or the boost switch 20 are disabled immediately, by an over-temperature signal (over temperature) that is sent to the buck gate driver 22 and the boost gate driver 24 from the temperature sensing circuit. Those skilled in the art would recognize that several methods of sensing temperature exist and may be used in the present invention.

Referring once again to FIG. 2, in another preferred embodiment of the present invention, a status circuit 70 may be provided as part of the non-inverting dual voltage regulation set point power supply 10. The preferred status circuit 70 is connected to the voltage feedback circuit 28. As illustrated, the preferred status circuit 70 includes an amplification circuit 72, an AND gate 74 and a filter 76. In addition, the amplification circuit 72 of the status circuit 70 is connected with the reference voltage connection 58. The purpose of the status circuit 70 is to provide an active pull-down output when the regulated output voltage (Vout) is out of regulation. In the preferred embodiment, this reset is used by the main microprocessor in the automobile to indicate faults and facilitate fault strategy. When the regulated output voltage (Vout) is within regulation, the output of the status circuit 70 is driven high.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A non-inverting dual voltage regulation set point power supply, comprising:

a main power source for supplying a supply voltage;

a regulated voltage generation circuit connected to said main power source for generating a regulated output voltage;

a voltage feedback circuit connected to said regulated voltage generation circuit having a first voltage divider network and a second voltage divider network, wherein the first voltage divider network produces a first feedback signal corresponding to an upper set point and the second voltage divider network produces a second feedback signal corresponding to a lower set point, the upper set point being generated independent of the second feedback signal and the lower set point being generated independent of the first feedback signal;

a buck switch connected to said main power source and said regulated voltage generation circuit for lowering the regulated output voltage generated by said regulated voltage generation circuit to said upper set point if said supply voltage from said main power source is greater than said upper set point;

a boost switch connected to said regulated voltage generation circuit for boosting the regulated output voltage generated by said regulated voltage generation circuit to said lower set point if said supply voltage from said main power source is less than said lower set point; and wherein said regulated output voltage follows said supply voltage from said main power source between said upper set point and said lower set point.

2. The non-inverting dual voltage regulation set point power supply of claim 1, further comprising a buck gate driver connected with said buck switch, wherein said buck gate driver controls the switching operation of sad buck switch such that said buck switch regulates the regulated output voltage at said upper set point.

3. The non-inverting dual voltage regulation set point power supply of claim 1, further comprising a boost gate driver connected with said boost switch, wherein said boost gate driver controls the switching operation of said boost switch such that said boost switch regulates the regulated output voltage at said lower set point.

4. The non-inverting dual voltage regulation set point power supply of claim 1, further comprising a regulation control circuit connected with said buck gate driver and said boost gate driver, wherein said regulation control circuit is used to selectively drive said buck gate driver and said boost gate driver to maintain the regulated output voltage between said upper set point and said lower set point.

5. The non-inverting dual voltage regulation set point power supply of claim 4, wherein said regulation control circuit comprises a pair of error amplifiers connected to a pair of pulse width modulation comparators.

6. The non-inverting dual voltage regulation set point power supply of claim 4, further comprising a voltage feedback circuit connected to said regulated output voltage and said regulation control circuit.

7. The non-inverting dual voltage regulation set point power supply of claim 6, wherein said voltage feedback circuit comprise a voltage divider circuit including a plurality of resistors.

8. The non-inverting dual voltage regulation set point power supply of claim 1, wherein said buck switch comprises a DMOS transistor.

9. The non-inverting dual voltage regulation set point power supply of claim 1, wherein said boost switch comprises a DMOS transistor.

10. The non-inverting dual voltage regulation set point power supply of claim 1, wherein said main power source comprises a battery.

11. The non-inverting dual voltage regulation set point power supply of claim 1, wherein said regulated voltage generation circuit comprises an inductor connected with a capacitor.

12. A non-inverting dual voltage regulation set point power supply for a restrain control module, comprising:

a main power source for supplying a supply voltage;

a regulated voltage generation circuit connected with said main power source for generating a regulated output voltage having an upper set point and a lower set point;

a voltage feedback circuit connected to said regulated voltage generation circuit having a first voltage divider network and a second voltage divider network, wherein the first voltage divider network produces a first feedback signal corresponding to an upper set point and the second voltage divider network produces a second feedback signal corresponding to a lower set point, the upper set point being generated independent of the second feedback signal and the lower set point being generated independent of the first feedback signal;

a buck switch connected to said main power source and said regulated voltage generation circuit for bucking the regulated output voltage to said upper set point if the supply voltage by said main power source is greater than said upper set point;

a boost switch connected to said regulated voltage generation circuit for boosting the regulated output voltage generated by said regulated voltage generation circuit to said lower set point if the supply voltage from said main power source is less than the lower set point;

a buck gate driver connected with said buck switch, wherein the said buck gate driver controls said buck switch such that said buck switch regulates the voltage level generated by said regulated voltage generation circuit at or below said upper threshold set point;

a boost gate driver connected with said boost switch, wherein said boost gate driver controls said boost switch such that said boost switch regulates the voltage level generated by said regulated voltage generation circuit at or above said lower threshold set point;

a regulation control circuit connected to said buck gate driver circuit and said boost gate driver, wherein said regulation control circuit is used to selectively drive said buck gate driver and said boost gate driver to maintain the regulated output voltage between said upper set point and said lower set point;

a voltage feedback circuit connected to said regulated voltage generation circuit and said regulation control circuit;

a status circuit connected to the voltage feedback circuit for monitoring the regulated output voltage; and wherein said regulated output voltage follows the supply voltage from said main power source between said upper set point and said lower set point.

13. The non-inverting dual voltage regulation set point power supply of claim 12, wherein said buck switch comprises a DMOS transistor.

14. The non-inverting dual voltage regulation set point power supply of claim 12, wherein said boost switch comprises a DMOS transistor.

15. The non-inverting dual voltage regulation set point power supply of claim 12, wherein said regulation control circuit comprises a pair of error amplifiers connected to a pair of pulse width modulation comparators.

16. The non-inverting dual voltage regulation set point power supply of claim 12, wherein said voltage feedback circuit comprises a voltage divider circuit including a plurality of resistors.

17. The non-inverting dual voltage regulation set point power supply of claim 12, wherein said main power source comprises a battery.

18. The non-inverting dual voltage regulation set point power supply of claim 12, wherein said regulated voltage generation circuit comprises an inductor connected with a capacitor.

19. A method of providing a non-inverting dual voltage regulation set point power supply, comprising:

supplying an input voltage with a main power source;

generating a regulated voltage generation circuit connected to said main power source;

providing a voltage feedback circuit connected to said regulated voltage generation circuit having a first voltage divider network and a second voltage divider network wherein the first divider network produces a first feedback signal corresponding to an upper set point and the second voltage divider network produces a second feedback signal corresponding to a lower set point, the upper set point being generated independent of the second feedback signal and the lower set point being generated independent of the first feedback signal;

bucking the regulated output voltage with a buck switch connected to said main power source and said regulated voltage generation circuit, wherein said buck switch regulates said regulated output voltage to said upper set point if said input voltage supplied from said main power source is greater than said upper set point; and boosting the regulated output voltage with a boost switch connected with said regulated voltage generate circuit, wherein said boost switch regulates the regulated output voltage to said lower set point if said input voltage supplied from said main power source is less than said lower set point, wherein said regulated output voltage follows an input voltage from said main power source between said upper set point and said lower set point.

20. The method of claim 19, further comprising the step of switching said buck switch with a buck gate driver connected to said buck switch, wherein said buck gate driver controls the switching operation of said buck switch such that said buck switch regulates the regulated output voltage at said upper set point if the voltage provided from said main power source is greater than said upper set point.

21. The method of claim 19, further comprising the step of switching said boost switch with a boost gate driver connected to said boost switch, wherein said boost gate driver controls the switching operation of said boost switch such that said boost switch regulates the regulated output voltage at said lower set point if the voltage provided from said main power source falls below the rower set paint.

22. The method of claim 19, further comprising the step of controlling regulation of said regulated output voltage with a regulation control circuit connected to said buck gate driver and said boost gate driver, wherein said regulation control circuit is used to selectively drive said buck gate driver and said boost gate driver to maintain the regulated output voltage between said upper set point and said lower set point.

23. The method of claim 22, wherein said regulation control circuit comprises a pair of error amplifiers connected to a pair of pulse width modulation comparators.

24. The method of claim 22, further comprising the step of providing a voltage feedback signal to said regulation control circuit from a voltage feedback circuit connected to said regulated output voltage.

25. The method of claim 24, wherein said voltage feedback circuit comprises a voltage divider circuit indulging a plurality of resistors.

26. The method of claim 22, wherein said buck switch comprises a DMOS transistor.

27. The method of claim 22, wherein said boost switch comprises a DMOS transistor.

28. The method of claim 22, wherein said regulated voltage generation circuit comprises an inductor connected with a capacitor.

* * * * *

UNITED STATES PATENT AND TRADEMARK OFFICE
CERTIFICATE OF CORRECTION

PATENT NO.    : 6,677,734 B2
DATED         : January 13, 2004
INVENTOR(S)   : Hubert Rothleitner et al.

It is certified that error appears in the above-identified patent and that said Letters Patent is hereby corrected as shown below:

Column 9,
Line 31, after "operation of" delete "sad" and substitute -- said -- in its place.

Column 12,
Line 14, delete "rower set paint." and substitute -- lower set point. -- in its place.

Signed and Sealed this

Twenty-second Day of June, 2004

JON W. DUDAS
*Acting Director of the United States Patent and Trademark Office*